Patented Feb. 21, 1939

2,147,752

UNITED STATES PATENT OFFICE 2,147,752

SHREDDED COCONUT AND PROCESS OF MAKING

Robert T. Northcutt, Cranford, N. J.

No Drawing. Application February 28, 1938,
Serial No. 193,082

7 Claims. (Cl. 99—125)

In accordance with the present invention, there is provided an improved process for the production of shredded coconut which is widely used as an ingredient in the baking and confectionery trades.

As generally produced, this shredded coconut is made from the fresh nuts, by removing the husk and hard shell, preferably with the aid of steam, the nut meat being obtained in whole and unbroken condition. Adhering to the nut meat is the familiar dark film which is shaved off by a special knife before the nut meat is subjected to the shredding operation. After the removal of this film is completed, the nut meat is now white and still whole. It is placed whole in a shredding machine where a set of notched knife blades cuts it into threads of several lengths, from 2" or 3" long down to ⅛" long, or even shorter. These shreds are then placed in a dryer, where the moisture is removed until there remains about 95% solids and 5% moisture.

The above description represents the standardized practice in the production of shredded coconut, the procedure having been virtually unchanged for many years. It is open to certain objections, however, especially from the standpoint of costs, in view of the relatively high price commanded by fresh coconuts.

Generally stated, the present invention provides a process for the production of shredded coconut from copra as the starting material, which shredded coconut will be quite comparable to the product produced from the fresh nut meats.

A further object of the invention is to reduce the losses of material incident to the production of shredded coconut from fresh nut meats.

A still further object of the invention is to provide a process for producing shredded coconut of a grade at least comparable to that produced from fresh nuts, while starting with the dried kernel, and effecting economies both in respect to the cost of the starting material, as well as, in general, other economies and lowered costs of production throughout the process.

Further objects of the invention will become apparent as the description proceeds, and the features of novelty will be pointed out in particularity in the appended claims which will also indicate the scope of the application of the improved process.

As is well known, copra is a dried kernel of the coconut from which the oil has not yet been expressed. Copra, either sun-dried or kiln-dried contains 50 to 65% of oil, while hot air-dried may run as much as 74%. In tropical regions, it is produced by breaking the nuts open, removing the shell, and allowing the kernel to dry, either in the air or in a kiln. The kernel is broken into pieces as the shell is removed, there being no particular precautions taken to prevent fracture of the nut meat, so that it comes in irregular pieces. It is the raw material for producing coconut oil, and as ordinarily found, it is dirty and more or less rancid. Even dirty and rancid copra may be used in the present process, although clean and non-rancid copra is preferred.

All copra retains the dark, hard film which occurs in the original nuts between the shell and the kernel proper, and it is necessary to remove this film, which may be done by any suitable cutting instrumentality, which will serve to shave off this thin film. After this film has been removed, in accordance with the present process, the copra is washed clean, the material previously having been treated by immersion in a weak alkali, for example, a 5% solution of hot, tri-sodium phosphate, which renders it sweet and non-rancid. After tests have indicated the removal of rancidity, the copra is immersed in water in order to wash out such residual tri-sodium phosphate as may be retained therein. Instead of tri-sodium phosphate, other weak alkalies such as sodium bicarbonate may be employed for the neutralizing treatment. The copra is now ready to be prepared for shredding. Of course, if the copra is initially non-rancid, the above neutralizing operation may be omitted.

In performing the shredding operation it is essential that the solid coconut meat be sufficiently pliant to permit a smooth cutting operation. If the knives are not sharp enough or if the meat is not sufficiently pliant it will be crushed rather than cut, which will result in the liberation of free oil. Shredded coconut should contain substantially all the original oil and, obviously, this cannot be if any oil is released during the shredding operation. In the practice of this invention, therefore, it is necessary that the neutralized copra be rendered pliant by the addition of water before the shredding operation. To achieve the desired degree of pliancy, the water must penetrate the copra completely without any damage to its cellular structure. No exact figure for final water content can be given. The real requirement is that the water penetration be complete, and when this has been achieved, the total water content will generally be found to be in the neighborhood of 30% or higher, although if the hydrating is done with extreme care, complete penetration may be accomplished by a total of only as low as 20% water. By "hydration" and "hydrating" in the claims, such a degree of water penetration is meant.

The hydration of the copra preparatory to shredding must be accomplished with considerable care. A preferred method is to immerse pieces of copra in a bath of water and permit them to soak up the requisite amount. Agitation should not be used to any appreciable degree, and the water should preferably not be above room temperature, for otherwise the cellular structure will be disturbed and the oil will either coalesce or be released. Raw copra ordinarily contains between 12 to 16% of water. As stated above, it should contain on an average at least 30% water before it will be sufficiently pliant for successful shredding. In order that it may take up this extra amount of water the copra requires complete immersion for from about 12 to 24 hours in a bath of water at room temperature.

The figures given above must be regarded as illustrative and based on averages. Obviously, the time element will vary, depending on the size of the individual structure of the copra under treatment. To insure success each batch of copra should be tested for complete water penetration. A simple test is to cut through a piece of hydrated copra, wipe the surface of the cut, drop on a water soluble solution of dye such as basic fuchsin or methylene blue, and after a few moments wipe the cut surface free of dye solution. Where the water has penetrated completely the dye will be well taken up by the copra, but if there is a central portion more or less oily, at that place the material will resist the dye. Insufficiently hydrated centers are thus quite plainly shown.

When a test indicates that substantially complete hydration has taken place the copra is shredded by any conventional shredding machine. After shredding the product is dried in conventional manner to any desired degree of moisture and the resulting product will be in general indistinguishable from that obtained from fresh nuts.

The above soaking process for re-hydrating the copra is simple, but the invention clearly covers other processes for the same purpose. Thus the copra may be hydrated by a weak steam treatment or by subjection to a warm moist atmosphere. The basic feature of this invention lies in the discovery that copra can be restored to its original state as fresh nut meat to the extent that it can be shredded. It must be understood that all processes based upon this discovery should come within the scope of this invention.

It is also to be understood that the following claims are intended to cover all of the generic and specific features herein described, and all statements of the scope of the invention, which, as a matter of language, might be said to fall therebetween; and that it is intended and desired to embrace within the scope of the invention such modifications and changes as may be necessary to adapt it to varying conditions and uses.

Having thus described my invention, what I claim as new and desire to secure by Letters Patent is:

1. A process for producing shredded coconut, which comprises hydrating copra, and shredding the resultant pliant material.

2. A process for producing shredded coconut, which comprises immersing copra in water until it is substantially hydrated and shredding the resulting pliant material.

3. A process for producing shredded coconut, which comprises immersing copra in water for from 12 to 24 hours, and shredding the resulting pliant material.

4. The process for producing shredded coconut, which comprises neutralizing copra to remove any rancidity therefrom, subjecting the treated copra to the action of water until the said copra becomes pliant, and shredding the resulting pliant material.

5. The process for producing shredded coconut, which comprises treating commercial copra with a weak alkali to neutralize any rancidity therein, rendering the thus-treated material pliant by acting thereon with water, and shredding the resulting product.

6. The process of preparing shredded coconut, which comprises preparing commercial copra by removing the hard, dark skin therefrom which occurs in the nut intermediate the shell of the nut and the kernel thereof, soaking the thus-treated copra in water until the copra becomes pliant, and shredding the resulting product.

7. The process of producing shredded coconut from commercial copra, which comprises removing from the copra the hard, dark film usually found thereon, neutralizing any rancidity in the copra by applying thereto a dilute solution of a weak alkali, washing out residual alkali, applying water to the neutralized product until the same becomes pliable, shredding the pliable product, and drying the resulting shredded material.

ROBERT T. NORTHCUTT.